April 26, 1960 L. GREBE 2,934,115
MACHINE FOR PROCESSING MEAT AND LIKE MATERIAL
Filed June 6, 1957
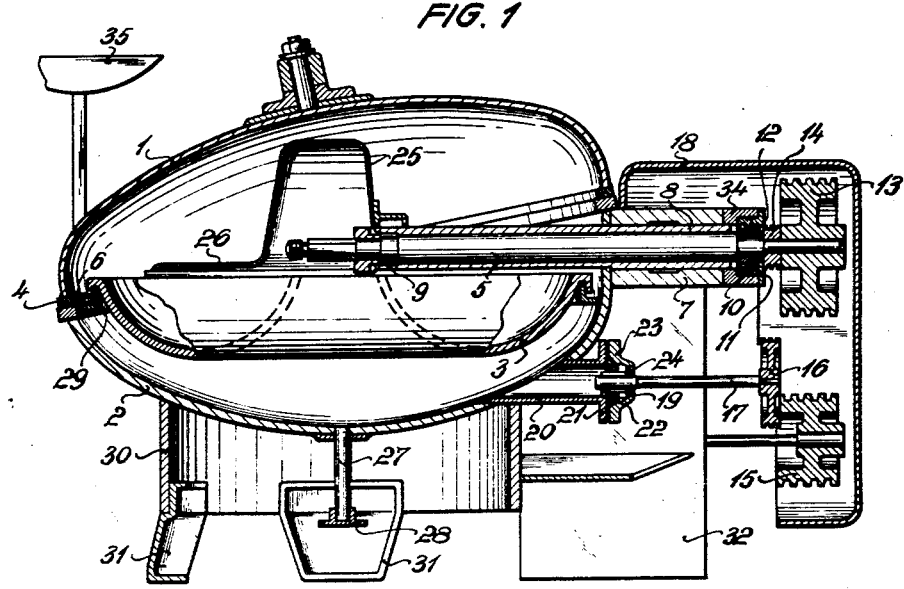
INVENTOR
LUDWIG GREBE United States Patent Office 2,934,115
Patented Apr. 26, 1960

2,934,115

MACHINE FOR PROCESSING MEAT AND LIKE MATERIAL

Ludwig Grebe, Wallau (Lahn), Germany, assignor to Kramer & Grebe Kg. Maschinen- und Modellfabrik, Wallau (Lahn), Germany Application June 6, 1957, Serial No. 664,096

Claims priority, application Germany June 8, 1956

9 Claims. (Cl. 146—67)

This invention relates to a machine for cutting and mixing alimentary products, foodstuffs and, in particular, meat material in a rotatable cutter bowl which is adapted to receive the latter, which is relatively shallow and into which tools extend for processing such material.

It is known that the housing which accommodates the receptacle or bowl and further the tools and the material to be worked upon is ball- or circular-shaped and of airtight construction, in order to facilitate the processing of the material under conditions of a vacuum.

The working of the material in vacuum has the advantage that the material remains free from air inclusions, which ensures durability and stability of meat and like foodstuffs which are easily susceptible to spoilage and odor.

The present invention aims at a construction of a meat processing machine which is extremely simplified as to its construction, is highly efficient and safe in operation and may work, if desired, under vacuum and in which the otherwise well known structural machine parts are employed, such as the shallow, suitably driven bowl and tools or cutters which extend or project into said bowl.

It is, therefore, one of the primary objects of this invention to provide means conducive to an improved housing structure, which encloses said bowl, receives the cutter tools and is capable of maintaining the required low pressure therein, said housing comprising an upper housing part and a lower housing part with abutting parting faces extending in an inclined plane.

It is another object of the invention to provide means affording a sturdy housing structure which may be easily serviced and manipulated during various operational conditions and is capable of readily taking up pressures prevailing under the conditions of a vacuum as the upper and lower housing parts are arcuately shaped or arched.

The disposition of the parting faces of the housing halves along an inclined or oblique plane has the advantage in machines with rotating tools of the aforesaid type, that the drive shaft for the tools and bearing parts therefor passing through the housing walls may now be disposed within the higher located section of the lower housing part, so that more efficacious and easily accessible sealing locations are created, which consist of the oblique, substantially planar parting line extending between the upper housing and lower housing parts and further of the connecting passage for the shaft or shafts disposed within the wall of the lower housing part.

While it may be preferable in machines which have only one tool carrying shaft, to arrange the highest point of the parting plane above the location, at which the shaft extends into the lower housing part, it becomes more advantageous and suitable in machines equipped with two shafts for carrying tools to dispose this highest point of the parting plane symmetrically with respect to both locations at which both said shafts penetrate or pass through the lower part of the housing.

It is still another object of the invention to provide means facilitating the discharge of the bowl under most favorable conditions as the bowl remains always within easy reach at the lowermost point or location of the parting line of both housing parts.

The invention further contemplates the provision of a swivelling or pivotable ejector, which may assume a most suitable position with respect to the lower part of the housing, where the discharge of the foodstuffs occurs.

It is a further object of the invention to provide means ensuring the pivotal movement of the ejector in dependence on the swinging movement of the upper housing part, which may be installed in a particular embodiment of the invention and may carry out its swinging movement relative to the lower part or remainder of the housing.

According to a further feature of the invention, the shaft on which the cutting tools are arranged in overhung position, passes at a higher location of the parting line through the lower part of the housing, which is provided with an outwardly projecting tubular piece or pipe socket for receiving a bush or bearing sleeve. This sleeve extend into said housing above the bowl close to the shaft portion on which the tools are mounted and on which a special sealing gland may be located which is enclosed by the corresponding end of the sleeve.

These and other objects and advantages may be realized by the present invention which is described in reference to the accompanying drawing, wherein:

Fig. 1 is a vertical section through a meat cutter and like machine embodying the invention.

Fig. 2 is a fragmentary top plan view of the machine of Fig. 1, parts thereof being shown in section and the upper housing part being shown in upwardly swung position.

Referring now more particularly to the drawing, there is disclosed an upper housing part 1 which is outwardly curved and an outwardly curved lower housing part 2 which provide a housing, in which a vacuum may be maintained and in which a cutter bowl may be rotatably journalled and moved by means of a drive mechanism (not shown).

The parting line or joint 4 consisting of facing or abutting edges or rings of said upper and lower housing parts 1, 2 and thus located between the upper housing part 1 and the lower housing part 2 extends in a common oblique plane and in such manner that the highest point or location of said plane is located above the wall portion of the lower housing part 2 through which a shaft 5 passes, which is adapted to carry the cutter tools.

While the rim of the lower housing part 2 is completely smooth, the rim of the upper housing part 1 is provided with a groove 6 recessed or undercut in cross section in which a sealing ring, i.e. rubber gasket of corresponding cross section is inserted, so that tight sealing for the two-part housing is ensured.

The upper housing half 1 is swingably arranged on the lower housing half 2, a bolt 33 being disposed adjacent the higher housing part section, whose axis extends parallel to the parting plane.

On the higher positioned section of the lower housing part 2 there is welded thereto a tubular piece or socket 7, in which a bush forming tubing 8 is received for enclosing shaft 5, said tube or sleeve 8 being removable together with a ring member 34 which aids in sealing said shaft and encloses a bearing 10 later referred to. Bush 8 extends far into the housing and above the cutter bowl 3. Adjacent the left hand end, as seen in Fig. 1, bush 8 carries a roller bearing 9 for shaft 5. A second roller bearing 10 for shaft 5 is disposed within a recess of the ring member 34 at the opposite end of tube 8. Against the end face of ring member 34 there is threaded a lid 11, so that between the roller bearing 10 and lid 11 a gasket 12 may tightly seal a projecting portion of shaft 5, gasket 12 being provided with lips which are pressed under great force against the shaft or shafts depending on the vacuum, which prevails in the housing.

At the end of the shaft 5 which extends beyond lid 11, two V-belt pulleys 13 and 14 are disposed having different diameters. The larger V-belt pulley 13 is operatively connected with a V-belt pulley 15 by means of an electro-motor (not shown).

From the smaller V-belt pulley 14 to V-belt pulley 16 runs a drive belt (not shown), said latter pulley being connected to a drive shaft 17 for imparting rotation to bowl 3.

These pulleys are protected against contact from the outside by a cover 18.

To facilitate journalling drive shaft 17 there is arranged and welded to the lower housing part 2 a short tubular piece or pipe socket 20 provided with a flange 21. Between a ring member 22 abutting against the end face of said tubular piece 20 and a lid 23 through which extends shaft 17 there is disposed a roller bearing 19. In lid 23 is further enclosed a gland or seal body 24 which has lips and surounds shaft 17 and exerts the same function as gland 12 hereinabove mentioned.

Within the upper housing part 1 there is provided a hood-shaped structure 25 which is made from sheet metal adapted to cover the cutting and mixing tools and is provided with an extension 26 which also covers partly bowl 3. The structural part 25 is arranged to be swung about an axis extending in crosswise direction to the axis of the shaft 5 and about sleeve or bush 8. The hood-shaped structural part 25 cooperates, when the machine is equipped for cutting operation, with the cutters or blades carried by shaft 5, as the material to be cut will be somewhat retained thereat or dammed up in a manner very desirable within the region of the cutting blades.

Besides this, the aforesaid structural part 25 also acts as a protective cover, as the machine will be supplied with material while the bowl and the cutting blades perform their rotation.

In order to avoid that any foodstuff or meat particles reach or penetrate from the bowl 3 to the lower housing part 2 there is provided a ring element 29 angular in cross section, whose free leg is directed upwardly and reaches below the profiled outer or peripheral rim 6.

In order to discharge the cutter bowl 3 there is disposed outside adjacent the lower housing part an ejector device with a turnable shield or cover 35 which is swivellable at 36 on arm 37, so that, as shown in Fig. 2, in the position of discharge cover 35 may extend close to the lowermost location of the parting line toward bowl 3.

When the housing is to be closed, the ejector device will be swung from the position just mentioned beyond the upper housing part to an upright position, as shown in Fig. 1. In order to facilitate easy swinging or swivelling movement of said turning cover 35 there is arranged a counter-weight 38, as seen in Fig. 2.

It is to be noted, that this swinging movement of the discharge or ejector device may be coordinated to the swinging movement of the upper housing part, to which said device may readily and operatively be connected for this purpose.

At the lowest portion of the lower housing part 2 there is disposed a downwardly projecting tubular piece 27 whose lowermost end is tightly closed by a cap 28. Through this tubular piece 27 any watery substance which might have been collected during cleaning or operation of the machine within the lower housing part, may thus be easily drained off. The aforesaid lower housing part 2 may also be provided with a manhole, which permits a person to reach into the lower housing part for cleaning and other purposes. Further affixed to the lower housing part 2 is a sheet metal ring 30 on which are attached supporting feet 31 for the machine housing. Below tubular piece 7 there extends a depending wall 32 on the rearward face of which, as seen in Fig. 1, there is attached an electro-motor (not shown). At this lower housing part 2 there is also disposed a connector piece (not shown) leading to a vacuum pump and conduit system therefor (not illustrated).

It can thus be seen that there has been provided in accordance with the present invention a machine for processing meat and like material and equipped with a rotatable bowl and shaft means for supporting a processing tool reaching into said bowl; comprising a housing having two complementary outwardly curved housing halves arranged in superposed and abutting relation along a common parting plane. The parting plane is being directed at an angle with respect to shaft means and bowl when enclosed in the housing. The lower housing half includes respective upper and lower wall portions located at opposite sides of a plane in which said shaft means extends, and means located in said upper wall portion of said lower housing half and below said parting plane for journalling said shaft means.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A machine for processing meat and like material and equipped with a rotatable bowl and shaft means for supporting a processing tool reaching into said bowl; comprising a housing having two complementary housing halves terminating in respective peripheral rims and arranged in superposed position and with their rims in abutting relation along a common inclined plane, said inclined plane being directed at an angle with respect to said shaft means and said bowl when enclosed in said housing, the lower housing half including respective upper and lower wall portions located at opposite sides of a plane in which said shaft means extends, and means located in said upper wall portion of said lower housing half and below said inclined plane for journalling said shaft means.

2. A machine according to claim 1, said journalling means extending from without said lower housing half through the latter and terminating with one end approximately at the center of said housing, said one end of said journalling means being located above said bowl and reaching into the upper housing half.

3. A machine according to claim 2, including protective means located above said bowl and arranged for swivelling movement on said journalling means adjacent said one end thereof, said protective means being adapted to envelop said processing tool and to overlie at least a portion of said bowl.

4. A machine according to claim 3, the upper housing half including means for swivelling the same relative to said lower housing half and about said journalling means adjacent the other end thereof.

5. A machine according to claim 1, the peripheral rim on said upper housing half being provided with an annular groove undercut in cross section, and a sealing ring located in said annular groove, to thereby provide an airtight connection between said rims of said superposed housing halves.

6. A machine according to claim 1, including means extending from one to the other housing half to swivelly move one of said housing halves relative to the other of said housing halves.

7. A machine according to claim 6, including discharge means for processed material and operatively connected for swivel movement with said one of said housing halves, whereby in one position said discharge means is located adjacent the lower wall portion of said lower housing half and in another position remote from both said housing halves.

8. A machine according to claim 1, including operable means extending beyond said lower housing half and into the latter and operatively connected with said bowl to rotate the same in dependence on the rotational movement of said shaft means, and respective driven means for said shaft means and said operable means.

9. A machine for processing meat and like material equipped with a rotatable bowl and with shaft means for supporting a processing tool reaching into said bowl; comprising a housing provided with two complementary and superposed housing halves having peripheral rims abutting against each other along a common inclined plane, means located on one of said rims forming an air-tight seal between said rims, said inclined plane being oriented at an angle with respect to said shaft means and said bowl when enclosed in said housing, the lower housing half including respective upper and lower wall portions located at opposite sides of a plane in which said shaft means extends, and means located in said upper wall portion of said lower housing half and below said inclined plane for journalling said shaft means.

References Cited in the file of this patent

UNITED STATES PATENTS

| | | |
|---|---|---|
| 2,664,128 | Braunwalder et al. | Dec. 29, 1953 |
| 2,681,279 | Sloan et al. | June 15, 1954 |